United States Patent

[11] 3,595,447

[72] Inventors William J. Carroll
West Lafayette, Ind.;
Frank S. Mizusawa, Garden Grove, Calif.
[21] Appl. No. 879,792
[22] Filed Nov. 25, 1969
[45] Patented July 27, 1971
[73] Assignee Great Lakes Chemical Corporation
West Lafayette, Ind.

[54] MULTIPLE OUTLET LIQUID METERING DEVICE
7 Claims, 2 Drawing Figs.

[52] U.S. Cl. ................................................. 222/250
[51] Int. Cl. .............................................. G01f 11/06
[50] Field of Search ......................................... 222/250,
478, 309

[56] References Cited
UNITED STATES PATENTS
2,673,012 3/1954 Harrington .................. 222/250
3,081,913 3/1963 Rotter ........................ 222/250

Primary Examiner—Stanley H. Tollberg
Attorneys—Gordon W. Hueschen and A. David Spevack ABSTRACT: A device for dispensing metered amounts of fluid under pressure from a single supply line to multiple distribution outlets having a pair of flow-directing cylinders with driven pistons connected by pipes to a pair of metering cylinders with free pistons so that when the driven pistons are at one end of their travel, fluid flows from the single supply line through the center of one of the driven pistons, through a pair of holes in the wall of the piston and the cylinder and into one end of each of the metering cylinders, thereby driving the free piston and the fluid in front of it toward the other end of its travel, the exiting fluid flowing through a pair of holes in the cylinder wall of the other flow-directing cylinder, around a pair of radial recesses in the outer wall of the driven piston therein and out another pair of oppositely positioned holes in the cylinder wall to a pair of distribution outlets; this action being reversed when the driven pistons are at the other end of their travel.

PATENTED JUL 27 1971

3,595,447

INVENTORS
WILLIAM J. CARROLL
FRANK S. MIZUSAWA

BY

ATTORNEY 3,595,447

MULTIPLE OUTLET LIQUID METERING DEVICE

BACKGROUND OF THE INVENTION

1. Field of the Invention

This invention relates to a dispensing apparatus for dispensing metered amounts of fluid from a single source to a plurality of discharge means.

A metering system free from constrictions or interruptions to the flow of fluids therein is particularly important when the disturbance of the liquid flow can cause an impairment in or total failure of the function of the metering unit. This can occur when the fluid is under high pressure, is viscous or contains suspended solids.

2. Description of the Prior Art

Several methods for measuring and dispensing of a liquid under pressure are known. See, for example, U.S. Pat. Nos. 1,225,669, 2,649,996 and 2,652,953. However, none of these patents discloses a dispensing device suitable for metering and dispensing viscous liquids, e.g., agricultural gel fumigants. Conventional equipment commonly used for metering and dispensing gel fumigants restricts the flow of the fumigant with orifices used to control the flow of fumigant, thereby creating back pressure on the fluid. This back pressure tends to clog the equipment causing the apparatus to be inoperative, thereby causing delays and inconveniences in the application of the fluid.

Equipment for dispensing fluid fumigants to soil is taken directly to the field on movable farm implements and necessarily must be simple to operate and relatively trouble free. Delays in fumigant application are expensive to the farmer and troublesome to the operator of the dispensing equipment.

SUMMARY OF THE INVENTION

According to this invention, there is a fluid-dispensing means which can dispense metered amounts of a viscous fluid from a single source to a multiplicity of dispensing outlets without the presence of constrictions to restrict the flow of the fluid, which comprises a pair of fluid-directing cylinders having driven pistons which alternately direct the fluid from the source to a plurality of metering cylinders and then back to the fluid-directing cylinders and out a plurality of discharge outlets therein.

OBJECTS OF THE INVENTION

It is an object of this invention to provide a metering device for dispensing metered amounts of a fluid to a multiplicity of distribution outlets. Another object is to provide such a device capable of dispensing viscous liquids, such as gel fumigants, without constricting the flow of the liquid. Another object is to provide such a device which dispenses fluids at a rate which is in substantially uninterrupted manner in direct proportion to the linear travel of the distribution implement employed in conjunction therewith. Another object is to provide such a metering device that is adjustable as to the volume and frequency of the metered amounts of fluid dispensed therefrom. Still another object is to provide a metering device suitable for use with agricultural implements that does not require constant regulation by the equipment operator to compensate for the speed of the tractor and does not need to be shut off each time the tractor stops. Other objects of the present invention will be apparent to those skilled in the art to which this invention pertains.

DESCRIPTION OF THE DRAWINGS

In the drawings, which illustrate an embodiment of the invention adapted for distribution of a viscous liquid.

Figure 1:
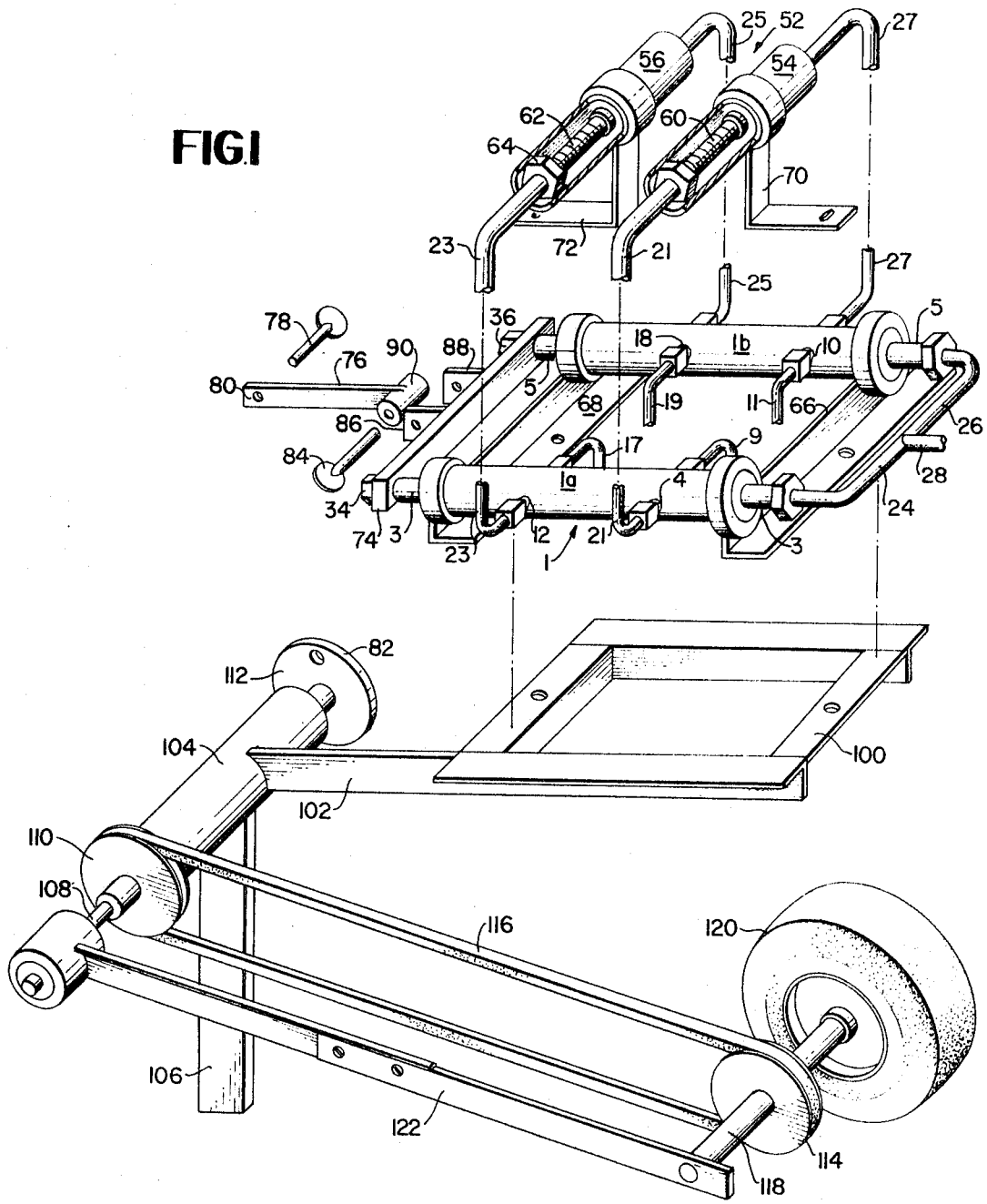
FIG. 1 is an exploded perspective side view of such a metering device according to the invention.
Figure 2:
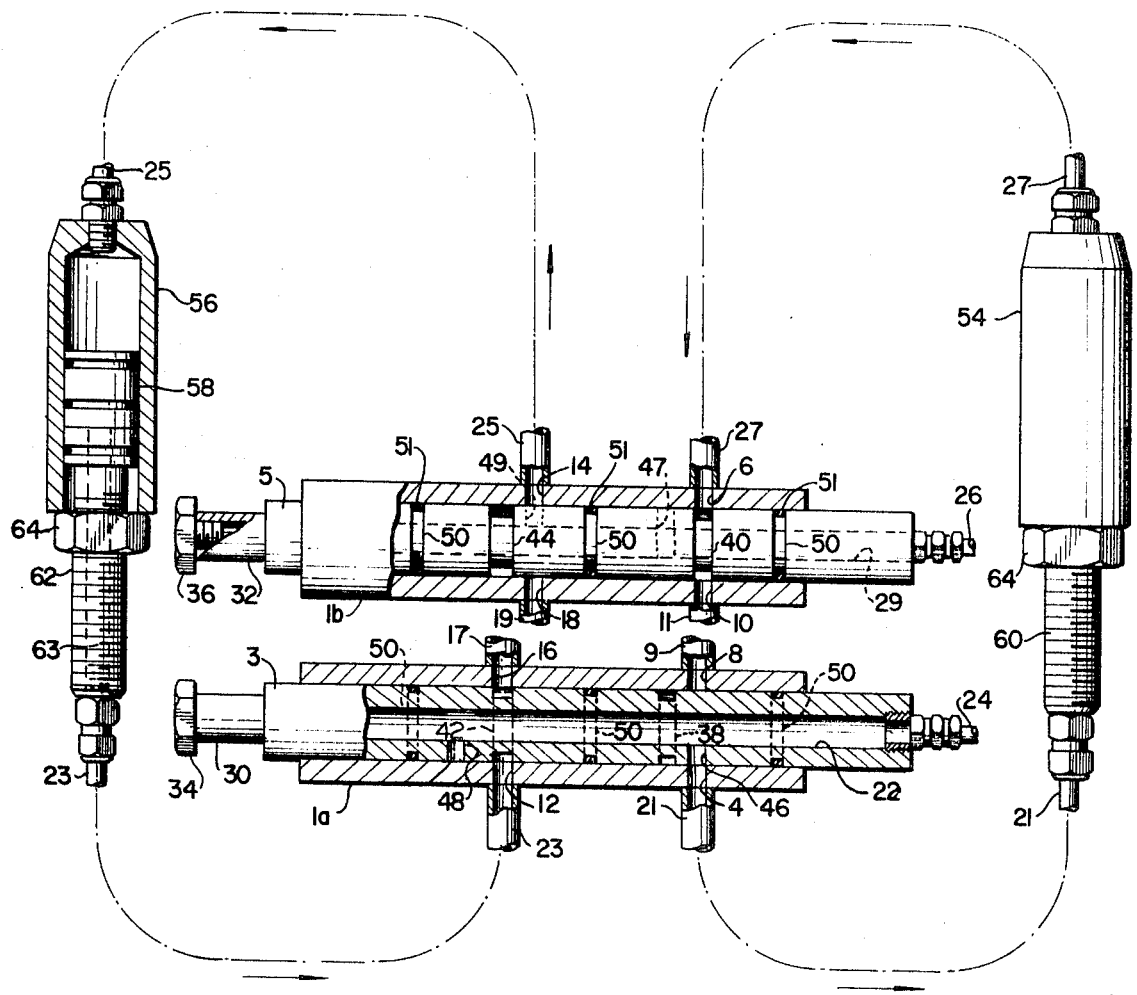
FIG. 2 is a partially cross-sectional perspective view of the flow-directing assemblies and the adjustable metering assemblies used in combination therewith.

In the embodiment shown in FIGS. 1 and 2, the flow-directing assembly 1 consists of two cylinder housings 1a and 1b open at both ends. Slidably mounted in their respective bores are hollow pistons 3 and 5 whose ends extend beyond the ends of cylinder housings 1a and 1b. Near one end of each of cylinder housing 1a and 1b are a pair of coaxial openings in the wall thereof providing metering ports 4 and 6 and exhaust ports 8 and 10, respectively, and rearwardly toward the other end thereof are another pair of coaxial openings in the wall thereof providing another pair of metering ports 12 and 14 and exhaust ports 16 and 18, respectively, each providing communication to the bore of the cylinder housing. Fitted to the exhaust ports 8, 10, 16 and 18 are pipes 9, 11, 17 and 19 which provide fluid communication with multiple distribution means (not shown).

Pistons 3 and 5 have an axial bore 22 extending the length thereof. One end 3a and 5a of each piston is connected to flexible liquid feedlines 24 and 26 which in turn are connected to a single flexible fluid feedline 28. The terminal portion 30 and 32 of the other end 3 and 5 of each piston has a smaller outside diameter than the main body of the piston. Removable cleanout plugs 34 and 36 are interiorly thread mounted in the ends 3b and 5b, respectively, of the piston and seals that end of the piston.

The outside walls of pistons 3 and 5 have annular recessed portions 38, 40, 42 and 44 of small diameter which provide fluid communication between ports 4 and 8, 6 and 10, 12 and 16, and 14 and 18, respectively, when aligned therewith. Each of pistons 3 and 5 have a forwardly positioned radial bore 46 and 47 and a rearwardly positioned bore 48 and 49 in the wall thereof which provides fluid communication between the axial bore 22 thereof and metering ports 4, 6, 12 and 14 of the cylinder housings 1a and 1b when aligned therewith. On each side of the annular recessed portions 38, 40, 42 and 44 of pistons 3 and 5 is an annular groove 50 which provides a seat for an O-ring gasket 51.

Metering assembly 52 consists of a pair of metering cylinders 54 and 56 each having a free piston 58 slidably mounted therein. One end of metering cylinder 54 is connected to pipe 27 and one end of cylinder 56 is connected to pipe 25. Thread mounted in the other end of each of cylinders 54 and 56 are adjustment sleeves 60 and 62 having an axial bore 63 therein which provide means for adjusting the volume of the metering cylinder bores of cylinders 54 and 56 and the length of travel of free piston 58. A locknut 64 provides locking means for adjustable sleeves 60 and 62. Connected to the free end of adjustment sleeves 60 and 62 are pipes 21 and 23, respectively.

Flow-directing cylinders 1a and 1b are mounted on a pair of angle iron members 66 and 68 and metering cylinders 54 and 56 are mounted on L-bars 70 and 72 which, in turn, are mounted on angle iron members 66 and 68, respectively.

The angle iron members 66 and 68, on which the flow-directing and metering assemblies are mounted, are connected to mounting frame 100 which is mounted by arm 102 to sleeve 104 which is mounted on support post 106. Sleeve 104 is a housing for drive shaft 108, on which are mounted driven pulleys 110 and 112 on opposite ends of sleeve 104. Driving pulley 110 and driving pulley 114 are connected by belt 116. Driving pulley 114 is mounted on shaft 118, on which is also mounted driving wheel 120. Shaft 118 is pivotally connected to shaft 108 by connecting arm 122.

A connecting bar 74, mounted on the terminal portions 30 and 32 of pistons 3 and 5, connects the pistons and is retained thereon by cleanout plugs 34 and 36. A stroke member 76 is rotatably connected at one end to a point near the edge of driven pulley 112 by pin 78 which passes through holes 80 and 82 of stroke member 76 and pulley 112, respectively, and to its other end to connecting bar 74 by pin 84 which passes through holes in mounting plates 86 and 88 on connecting bar 74 and bushing 90 on that end of stroke member 76.

In operation, a stream of liquid enters feedline 28, is divided and passes through feedlines 24 and 26, and then enters the axial bores 22 and 29 of hollow pistons 3 and 5, filling their entire length. When pistons 3 and 5 are at one end of their stroke, as shown in FIG. 2, the liquid in bore 22 of piston 3 passes through radial bore 46 therein, through metering port 4 of cylinder housing 1a, through pipe 21 and into metering assembly 54 through hollow adjustment sleeve 60. Liquid in bore 29 of piston 5 travels through its radial bore 49 and through metering port 14 of cylinder housing 1b, through pipe 25 and into metering assembly 56 through its end which is opposite the end bearing hollow adjustment sleeve 62.

As shown in FIG. 2, the liquid entering pipes 21 and 25 respectively, of metering cylinders 54 and 56 forces free piston 58 to the opposite end of the metering cylinders which forces the liquid on the opposite side of the free piston out of the metering cylinders and into pipes 23 and 27. Because pistons 3 and 5 are in "exhaust" position with respect to metering ports 6 and 12 and exhaust ports 16 and 10, respectively, of cylinder housing 1a and 1b, there is no back pressure on the fluid discharge from metering assemblies 54 and 56. The liquid exhausted from metering cylinders 54 and 56 enters metering ports 12 and 6 of cylinder housings 1a and 1b, respectively, passes around annular recesses 42 and 40 of hollow pistons 3 and 5, respectively, and is exhausted through exhaust ports 16 and 10 and exhaust pipes 17 and 11, respectively.

Slidable mounted hollow pistons 3 and 5 are in the extreme left position of their travel as pictured in FIG. 2. When they are in opposite extreme position of their travel, liquid exits axial bores 22 and 29 through radial bores 48 and 47 therein, passes through metering ports 12 and 6, and then through pipes 23 and 27 into metering assemblies 54 and 56 thereby forcing the free piston therein to the opposite end of the cylinder bore. At the same time, liquid on the opposite side of the free piston is forced from the metering assemblies 54 and 56 through pipes 21 and 25, and metering ports 4 and 16, around annular recesses 38 and 44, out exhaust ports 8 and 18 and through pipes 9 and 19. In this manner the entire metering device cooperates to provide an uninterrupted flow of liquid through axial bores 22 and 29, thereby preventing bumping and vibration in the apparatus.

The stroke or distance of travel of the hollow pistons 3 and 5 must be such that annular recesses 42 and 40 therein are in exact alignment with metering ports 12 and 6, respectively, and exhaust ports 16 and 10, respectively, and radial bores 46 and 49 therein are in exact alignment with metering ports 4 and 14, respectively, at one end of the stroke. Moreover, annular recesses 38 and 44 are in exact alignment with metering ports 4 and 14, respectively, and exhaust ports 8 and 18, respectively, and radial bores 48 and 47 therein are in exact alignment with metering ports 12 and 6, respectively, at the other end of their stroke. This will assure a smooth, continuous flow of liquid from the apparatus. In the preferred embodiment, this distance of piston travel is three-quarters of an inch. Adjustments to individual hollow pistons may be made at connecting bar 74 and to both hollow pistons by changing the distance of hole 82 to the center of driven pulley 112.

Hollow pistons 3 and 5 are fitted with removable cleanout nuts 34 and 36 respectively, to facilitate cleaning the equipment when using viscous liquids and at the end of spreading operations. In the preferred embodiment flexible liquid feedlines 24 and 26 are made of clear or translucent plastic such as polyethylene, so the flow of liquid through the system can be followed visually.

FIG. 1 shows an embodiment of the invention particularly suitable for agricultural applications. Support post 106 can be mounted on the rear of a farm tractor (not shown). Pivotally mounted driving wheel 120 follows the surface of the ground over which the apparatus travels. In this manner, the rate of reciprocation of hollow pistons 3 and 5 and the volume of liquid dispensed by the apparatus is directly proportional to the distance wheel 120 travels as it follows the ground surface. Thus, the rate of application of liquid onto the ground is independent of the speed of the implement moving the apparatus.

It will be apparent to one skilled in the art that the capacity of the system can be increased by increasing the number of annular recesses and radial bores in the flow-directing pistons, increasing the number of metering and exhaust ports in the flow-directing cylinder housings and increasing the number of metering assemblies in association therewith.

An obvious modification of the invention for dispensing a single stream of liquid consists of a single cylinder housing 1a, a single piston 3 and a single metering assembly 54 connected at one end to cylinder housing 1a by pipe 21 as shown in the drawings and at the other end by connecting pipe 27 with pipe 23. The internal structure and function of the metering and flow-directing assemblies of this embodiment are as described above, i.e., while one-half of the hollow piston is in a "fill" position, the other half is in the exhaust position, thereby alternatively discharging liquid from exhaust ports 8 and 16.

An important aspect of the invention is that the slidably mounted hollow piston has an axial bore extending the entire length thereof originating at the flexible liquid feedline and terminating at a removable flush-out plug. By this feature, the assemblies can be cleared of liquid contained therein at the conclusion of use of the device. This is critically important when the device is used to meter viscous liquids such as gel fumigants, for example. Gel fumigants often clog due to the restrictions found in conventional equipment.

Another obvious modification of the invention is the manner in which the slidable hollow flow-directing piston is moved within its housing. As shown in FIG. 1, the piston is connected with a stroke member providing a constant driving means for reciprocating the piston. A unit adapted for continuous operation is essential for many applications to which the unit may be put. Connecting the driving means for reciprocating the piston with a driving wheel which travels along the ground assures a constant rate of distribution of the liquid on the ground irrespective of the speed of travel of the tractor or other source of movement.

What we claim is:

1. A dispensing device for dispensing metered amounts of liquid under pressure from a single supply to multiple discharge lines comprising;
   a. a flow-directing cylinder having
      i. a cylinder housing with an axial bore therein which is open at each end and which has two pairs of coaxially positioned metering and exhaust ports in the wall thereof which communicate with the cylinder bore, the exhaust ports each being connected to a separate discharge line,
      ii. a hollow piston slidably mounted and reciprocally driven in said cylinder bore having a closed end and an open end, a pair of annular recesses in the face thereof, and a pair of radial bores therein leading from said annular recess and providing communication to the axial bore of said piston, one of said annular recesses being positioned so as to be in alignment with one of said pairs of metering ports and exhaust ports and one of said radial bores in said piston being positioned so as to be in alignment with another of said metering ports when said piston is at the one end of its path of travel in said cylinder bore and another of said annular bores being positioned so as to be in alignment with another of said pairs of metering ports and exhaust ports and the other of said axial bores being positioned so as to be in alignment with the other of said metering ports when said piston is at the opposite end of its path of travel in said cylinder bore,
      iii. a liquid feedline fitted to the open end of said piston movable therewith,
   b. a metering assembly comprising a cylinder housing having a cylinder bore open at both ends, a reciprocating free piston slidably mounted within said cylinder bore, and
   c. liquid flowlines connecting the metering ports of said cylinder housing to the open ends of the cylinder bore of said metering assembly.

2. A dispensing device according to claim 1 comprising a means for adjusting the length of said cylinder bore of said metering assembly thereby changing the distance of travel of said free piston and the volume of liquid dispensed by said metering assembly with each stroke of said free piston therein.

3. A dispensing device according to claim 1 wherein the closed end of said hollow piston is fitted with a removable cleanout plug.

4. A dispensing device for dispensing metered amounts of liquid under pressure from a single supply line to a multiplicity of discharge lines, comprising
   a. a pair of flow-directing cylinders, each of which has
      i. a cylinder housing having a cylinder bore therein which is open at each end and which has two pairs of metering ports and exhaust ports coaxially positioned in the wall of the cylinder housing and communicating with the cylinder bore, each of said exhaust ports being connected to a separate discharge line,
      ii. a hollow piston slidably mounted in said cylinder bore having a closed end and an open end, a pair of annular recesses in the face thereof, and a pair of radial bores therein positioned from said annular recesses and providing communication to the hollow interior of said piston, said annular recesses and bores being positioned so that one of said annular recesses is in alignment with one of said pairs of metering and exhaust ports and one of said radial bores is in alignment with another of said metering ports when said piston is at one end of its path of travel in said cylinder bore and the other of said annular recesses is in alignment with one of said pairs of metering and exhaust ports and the other of said radial bores is in alignment with the other of said metering ports when said piston is at the opposite end of its path of travel in said cylinder bore;
      iii. a liquid feedline fitted to the open end of said piston movable therewith,
   b. a pair of metering assemblies, each comprising a cylinder housing having a cylinder bore, open at both ends, and a reciprocating free pistons slidably mounted in said cylinder bore,
   c. liquid flow lines connecting said metering ports with one of said open ends of the cylinder bore of one of said metering assemblies; and
   d. a reciprocally driven stroke member mounted on the closed end of each of said pistons of said flow-directing assemblies.

5. A dispensing device according to claim 4 wherein the reciprocally driven stroke member is driven by a ground-following member connected to means for transmitting the rotary motion of said wheel in a reciprocating manner to said stroke member.

6. A dispensing device according to claim 4 wherein one end of each of said metering assemblies is fitted with an adjustment means for varying the length of the cylinder bore thereof.

7. A dispensing device according to claim 4 wherein the closed end of said hollow piston is fitted with a removable cleanout plug.